United States Patent
Song et al.

(10) Patent No.: US 7,949,460 B2
(45) Date of Patent: May 24, 2011

(54) METHOD AND APPARATUS FOR SUPPLYING FUEL OF LPG CAR HAVING LPI SYSTEM

(75) Inventors: Jin-Woo Song, Icheon-si (KR); Eun-Sik Choo, Seoul (KR); Young-ki Min, Icheon-si (KR); Jae-Min Jung, Yongin-si (KR); Jeong-Hoon An, Icheon-si (KR); Young-Joo Park, Goyang-si (KR)

(73) Assignee: Continental Automotive Systems Corporation, Icheon-si, Gyeonggi-do (KR)

( * ) Notice: Subject to any disclaimer, the term of this patent is extended or adjusted under 35 U.S.C. 154(b) by 0 days.

(21) Appl. No.: 12/303,109

(22) PCT Filed: May 31, 2007

(86) PCT No.: PCT/KR2007/002646
§ 371 (c)(1),
(2), (4) Date: Aug. 17, 2009

(87) PCT Pub. No.: WO2007/139358
PCT Pub. Date: Dec. 6, 2007

(65) Prior Publication Data
US 2009/0312935 A1    Dec. 17, 2009

(30) Foreign Application Priority Data

Jun. 1, 2006   (KR) .................. 10-2006-0049557
Sep. 5, 2006   (KR) .................. 10-2006-0085361
Oct. 31, 2006  (KR) .................. 10-2006-0106863
Nov. 1, 2006   (KR) .................. 10-2006-0107288
Nov. 3, 2006   (KR) .................. 10-2006-0108384
Dec. 27, 2006  (KR) .................. 10-2006-0135050

(51) Int. Cl.
*F02D 41/30*   (2006.01)
*F02M 21/02*   (2006.01)

(52) U.S. Cl. ........................ 701/103; 123/445
(58) Field of Classification Search .......... 701/101–105, 701/108, 110, 112–115; 123/27 GE, 299, 123/304, 339.28, 339.29, 357, 385, 393, 123/394, 401, 527, 575
See application file for complete search history.

(56) References Cited

U.S. PATENT DOCUMENTS 5,325,838 A    7/1994    Bennett
(Continued)

FOREIGN PATENT DOCUMENTS
JP    2000-179394    6/2000
(Continued)

OTHER PUBLICATIONS

PCT International Search Report for PCT Counterpart Application No. PCT/KR2007/002646 containing Communication relating to the Results of the Partial International Search, 3 pgs., (Jul. 27, 2007).

(Continued)

*Primary Examiner* — Stephen K Cronin
*Assistant Examiner* — Johnny H Hoang
(74) *Attorney, Agent, or Firm* — Blakely, Sokoloff, Taylor & Zafman LLP.

(57) ABSTRACT

Disclosed is method and apparatus for supplying fuel of LPG car having LPI system. More particularly, the present invention generates a gas fuel injection signal based on a gasoline fuel injection signal and directly injects LPG fuel within a fuel tank to a combustion chamber using the generated gas fuel injection signal to drive an engine. Therefore, an engine can be easily changed, the manufacturing cost of a duel car of LPG and gasoline can be reduced, and the manufacturing process thereof can be simplified.

46 Claims, 6 Drawing Sheets

U.S. PATENT DOCUMENTS

| | | | | |
|---|---|---|---|---|
| 5,379,740 A * | 1/1995 | Moore et al. | ............... | 123/478 |
| 5,526,786 A * | 6/1996 | Beck et al. | ............... | 123/357 |
| 6,125,797 A * | 10/2000 | Dupointe | ............... | 123/27 GE |
| 6,367,443 B1 * | 4/2002 | Bassi et al. | ............... | 123/198 F |
| 6,684,849 B2 * | 2/2004 | zur Loye et al. | ............... | 123/295 |
| 6,766,269 B2 * | 7/2004 | Lee | ............... | 702/136 |
| 7,182,073 B1 * | 2/2007 | Kim | ............... | 123/527 |
| 7,305,939 B2 * | 12/2007 | Carlson | ............... | 123/27 GE |
| 7,703,435 B2 * | 4/2010 | Surnilla et al. | ............... | 123/304 |
| 2002/0134362 A1 * | 9/2002 | Deutsch | ............... | 123/575 |
| 2006/0054145 A1 * | 3/2006 | Hayashi et al. | ............... | 123/527 |

FOREIGN PATENT DOCUMENTS

| | | |
|---|---|---|
| JP | 2001-041085 | 2/2001 |
| JP | 2004-052560 | 2/2004 |
| JP | 2004-150411 | 5/2004 |
| JP | 2005-180228 | 7/2005 |
| KR | 1020020078470 | 10/2002 |
| KR | 1020030054613 | 7/2003 |
| KR | 1020050104632 | 11/2005 |

OTHER PUBLICATIONS

PCT Written Opinion of the International Searching Authority for PCT Counterpart Application No. PCT/KR2007/002646, 4 pgs., (Jul. 27, 2007).

Office Action from Korean Patent Office for foreign counterpart Korean Patent Application No. 10-2006-0135050, 6 pgs., (Sep. 3, 2007).

Office Action from Korean Patent Office for foreign counterpart Korean Patent Application No. 10-2006-0106863, 6 pgs., (Aug. 22, 2007).

Office Action from Korean Patent Office for foreign counterpart Korean Patent Application No. 10-2006-0085361, 5 pgs., (Apr. 16, 2007).

Office Action from Korean Patent Office for foreign counterpart Korean Patent Application No. 10-2006-0107288, 5 pgs., (Jun. 25, 2007).

\* cited by examiner

METHOD AND APPARATUS FOR SUPPLYING FUEL OF LPG CAR HAVING LPI SYSTEM

CROSS REFERENCE TO RELATED APPLICATIONS

This patent application is a U.S. National Phase application under 35 U.S.C. 371 of International Application No. PCT/KR2007/002646, filed on May 31, 2007, entitled METHOD AND APPARATUS FOR SUPPLYING FUEL OF LPG CAR HAVING LPI SYSTEM, which claims priority to South Korean patent application numbers 10-2006-0049557, filed Jun. 1, 2006; 10-2006-0085361, filed Sep. 5, 2006; 10-2006-0106863, filed Oct. 31, 2006; 10-2006-0107288, filed Nov. 1, 2006; 10-2006-0108384, filed Nov. 3, 2006; and 10-2006-0135050, filed Dec. 27, 2006.

TECHNICAL FIELD

The present invention relates to a method and apparatus for supplying fuel of a liquefied petroleum gas (LPG) car having a liquefied petroleum gas injection (LPI) system, and particularly to a method and apparatus for supplying fuel, wherein an engine is driven by LPG.

BACKGROUND ART

Liquefied petroleum gas (LPG) is used with gasoline for car fuel since it has a high octane number, a superior thermal resistance, and inexpensive prices.

The LPG supplied to a car engine is in a liquid form. When the LPG in liquid form is vaporized, the fuel and air can be easily mixed so that combustibility can increase. In other words, LPG prevents frequent knocking and eliminates phenomena such as vapor-lock and percolation, in comparison with gasoline or light oil used for a conventional car engine. Therefore, the application range of LPG has increased as an alternative fuel of gasoline or diesel.

A device of supplying the LPG supplies LPG in the liquid form to a gas injector by using a fuel pump, the LPG is sprayed through the gas injector to a cylinder, and the sprayed LPG is mixed with air to be vaporized.

A dual-fuel car of LPG and gasoline essentially requires a vaporizer, a mixer, and LPG fuel bomber, a solenoid valve, and LPG engine control units for controlling the solenoid valve.

Due to the above essential constitution, the manufacturing cost of a dual-fuel car of LPG and gasoline has increased, and the manufacturing process thereof has been complicated.

DISCLOSURE OF INVENTION

Technical Problem

The present invention is provided to overcome the foregoing stated problem which the prior art contains. It is the object of the present invention to provide a method and apparatus for supplying fuel of an LPG car having an LPI system, which generates a gas fuel injection signal based on a gasoline fuel injection signal, and directly injects LPG fuel in a fuel tank to a combustion chamber using the generated gas fuel injection signal so as to drive an engine, thereby easily designing an engine or easily changing the design, reducing the manufacturing cost of a car, and simplifying the manufacturing process thereof.

Technical Solution

In order to achieve the object of the present invention from the first viewpoint, an apparatus for supplying gasoline and liquefied petroleum gas fuel of a liquefied petroleum gas (LPG) car is suggested, having a liquefied petroleum gas injection (LPI) system, which is a direct LPG injection scheme, the apparatus comprising: a plurality of injectors which are formed at an intake manifold and inject one of gasoline fuel and LPG fuel to a cylinder to drive an engine; a gasoline engine control unit which receives an engine load condition from the outside, generates a gasoline fuel injection signal according to injection time of the gasoline fuel compared to the received engine load condition, calculates time information for controlling the plurality of injectors based on engine speed information and proportional constant information provided from the outside, and generates a pulse signal for controlling the plurality of injectors based on the time information; an LPG engine control unit which is connected to the gasoline engine control unit, receives data information predetermined according to the gasoline fuel injection time, compensates for the predetermined data information to be in inverse-proportion to a fuel pressure exhausted from an LPG fuel tank according to a driving of a fuel pump formed within the LPG fuel tank, calculates the proportional constant information corresponding to the fuel injection time when the LPG fuel is supplied based on the compensated data information, provides the calculated proportional constant information to the gasoline engine control unit, and receives the pulse signal provided from the gasoline engine control unit to convert the signal to a gas fuel injection signal for driving the plurality of injectors and provide it to the plurality of injectors; and an LPG engine which supplies the LPG fuel to the intake manifold to admix the LPG fuel with air supplied from the outside, the LPG fuel within the LPG fuel tank being exhausted by the fuel pump driven by the control of the LPG engine control unit, injects the mixed LPG fuel through the injectors to the cylinder to drive the engine, and returns the fuel remaining in the plurality of injectors to the LPG fuel tank.

The engine load condition of the gasoline engine control unit may be calculated by one of intake air amount information, throttle location information, and intake manifold pressure information.

The engine speed information may be one of vehicle speed information, crank shaft location information, and cam shaft location information.

The gasoline engine control unit and the LPG engine control unit may be integrally formed with each other.

The LPG engine control unit may further comprise a communication module capable of controller area network (CAN) communication to transmit the proportional constant information provided from the LPG engine control unit to the gasoline engine control unit and receive the pulse signal provided from the gasoline engine control unit.

The LPG engine control unit may further comprise a display module which is connected to the gasoline engine control unit to inform a car driver of the communication information between the LPG engine control unit and the gasoline engine control unit provided by the CAN communication module. The communication information may be default information detected by the LPG engine control unit.

The pressure of the LPG gas in liquid form may be greater than the fuel pressure in the fuel tank by 5 Bar.

The LPG engine control unit may further comprise a fuel pump driver for driving the fuel pump.

The LPG engine control unit may store peak time, hold time information, and saturation time information, the peak time and hold time information being driving time of the injector, the saturation time information being to remove the icing phenomenon, if it occur, based on outer air temperature and cooling water temperature supplied from the gasoline engine control unit, it may output a saturation signal providing the saturation time according to an in-advance programmed injector control order if a condition for generating the icing phenomenon is satisfied, and it may output a peak and hold signal providing the peak time and hold time if the condition for generating the icing phenomenon is not satisfied.

In other words, the LPG engine control unit may output the saturation signal if the icing phenomenon occurs at the end of the injectors based on the outer air temperature and cooling water temperature provided from the outside, and it may output the peak and hold signal if the icing phenomenon does not occur at the end of the injectors.

The saturation signal may have an increasing section in which electricity increases to provide predetermined voltages to the injector and a maintaining section.

The peak and hold signal may comprise a peak signal providing peak time, which is an initial driving time of the injector, and a pulse width modulation hold signal corresponding to maintenance of the driving of the injector during hold time, which is a drive maintaining time of the injector.

The plurality of injectors each may comprise: an output driver which is connected to an output end of the LPG engine control unit when the engine is initially driven to supply one of the peak and hold signal and the saturation signal to the corresponding injector; and an electricity detector part which senses output electricity of the corresponding injector and outputs injector electricity information to supply the electricity to the LPG engine control unit.

The electricity detector part may monitor the injector electricity information during the peak time and controls the electricity supplied to the corresponding injector depending on the monitoring result.

The electricity detector part may comprise: an electricity detector which senses electricity of the output driver to output electricity in the form of voltage; and a comparator which compares the output voltage of the electricity detector with a predetermined reference voltage and output the injector electricity information depending on the comparison result.

The comparison part may comprise a comparator which outputs the injector electricity information of a low potential level if the output voltage of the electricity detector is equal to or greater than the reference voltage, and which outputs the injector electricity information of a high potential level if the output voltage of the electricity detector is less than the reference voltage.

The comparison part may also comprise a comparator which outputs the injector electricity information of a high potential level if the output voltage of the electricity detector is equal to or less than the reference voltage, and which outputs the injector electricity information of a low potential level if the output voltage of the electricity detector is greater than the reference voltage.

The corresponding injector may further comprise a cut-off valve of the injector which is formed in a fuel path between a plunger and a nozzle, and cuts off the fuel path between the plunger and the nozzle when a start key is off, the plunger opening and closing the fuel path between an inlet, which is raised and lowered by a solenoid coil and in which fuel flows, and the nozzle, through which fuel is injected.

If a received starting signal is on, the LPG engine control unit may determine, based on crank shaft location information and cam shaft location information supplied from the gasoline engine control unit, whether the engine is driven, and if the engine is determined to be driven, it receives engine state information of the gasoline engine control unit to vary time for controlling the cut-off valve of the injector to be opened.

In other words, the LPG engine control unit may receive engine state information of the gasoline engine control unit to vary the time for controlling the cut-off valve of the injector to be opened if a first effective tooth is detected by the crank shaft location information and the cam shaft location information.

The engine state information may be one or more of fuel temperature information, fuel injection state information, engine rotation information, battery voltage information, and CAN communication state information.

The LPG engine control unit may control the cut-off valve of the injector to be opened after a first predetermined time passes if the fuel temperature information supplied from the outside is greater than or equal to a predetermined value.

The LPG engine control unit may control the cut-off valve of the injector to be opened after a second predetermined time passes if the plurality of injectors are determined to be injecting LPG fuel based on the fuel injection state information.

The LPG engine control unit may control the cut-off valve of the injector to be opened after a third predetermined time passes if the engine is determined to rotate based on the engine rotation information.

The LPG engine control unit may control the cut-off valve of the injector to be opened after a fourth predetermined time passes if the battery voltage is determined to be less than or equal to a predetermined value based on the battery information.

The LPG engine control unit may control the cut-off valve of the injector to be opened after a fifth predetermined time passes if the CAN communication line is determined to have an error based on the CAN communication state information.

The predetermined value may be 50° C., the first predetermined time may be 100 msec, the second predetermined time may be 0 msec, the third predetermined time may be 50 msec, the predetermined set value may be 8 volt, the fourth predetermined time may be 100 msec, and the fifth predetermined time may be 500 msec.

In order to achieve the object of the present invention from the second viewpoint, a method for supplying fuel of a LPG car having an LPI system is suggested, the method comprising the steps of: (a) receiving an engine load condition by throttle location information and intake manifold input information provided from the outside, and transmitting data information predetermined according to injection time of gasoline fuel compared to the received engine load condition to an LPG engine control unit; (b) the LPG engine control unit receiving the data information predetermined according to the injection time of the gasoline fuel, compensating for the predetermined data information to be in inverse-proportion to a fuel pressure exhausted from an LPG fuel tank according to a driving of a fuel pump formed within the LPG fuel tank, calculating the proportional constant information corresponding to the fuel injection time when the LPG fuel is supplied based on the compensated data information, and providing the calculated proportional constant information to the gasoline engine control unit; (c) a gasoline engine control unit calculating time information for controlling a plurality of injectors based on engine speed information provided from the outside, the injection time information of gasoline fuel in step (a), and the proportional constant information in step (b), and generating a pulse signal for controlling the plurality of injectors based on the time information to transmit the pulse signal to the LPG engine control unit; (d) the LPG engine control unit receiving the pulse signal provided from the gasoline engine control unit to convert the signal to a gas fuel injection signal for driving the plurality of injectors and providing it to the plurality of injectors; and (e) supplying the LPG fuel to an intake manifold to admix the LPG fuel with air supplied from the outside, the LPG fuel within the LPG fuel tank being exhausted by the fuel pump driven by the control of the LPG engine control unit, injecting the mixed LPG fuel through the plurality of injectors to a cylinder to drive an engine, and returning the fuel remaining in the plurality of injectors to the LPG fuel tank.

The engine load condition may be calculated by one of intake air amount information, throttle location information, and intake manifold pressure information.

The engine speed may be one of vehicle speed information, crank shaft location information, and cam shaft location information.

A CAN communication may be performed to transmit the proportional constant information provided from the LPG engine control unit to the gasoline engine control unit and receive the pulse signal provided from the gasoline engine control unit.

The method may further comprise step: (f) displaying communication information between the LPG engine control unit and the gasoline engine control unit provided by the CAN communication module. The communication information may be default information detected by the LPG engine control unit.

The pressure of the LPG gas in a liquid form may be greater than the fuel pressure in the fuel tank by 5 Bar.

Step (d) may determine, based on outer air temperature and cooling water temperature provided from the outside, whether the condition for generating the icing phenomenon at ends of the plurality of injectors is satisfied, and if the condition for generating the icing phenomenon is satisfied, it may output a saturation signal having saturation time information for removing the icing phenomenon at the plurality of injectors to serial signals, and if the condition for generating the icing phenomenon is not satisfied, it may output a peak and hold signal having peak time and hold time information, which is driving time of the plurality of injectors, to serial signals, respectively.

Step (d) may comprise the steps of: (d-1) determining, based on outer air temperature and cooling water temperature provided from the outside, whether a condition for generating the icing phenomenon at ends of the plurality of injectors is satisfied; (d-2) if the condition for generating the icing phenomenon is satisfied as the result of step (d-1), outputting a saturation signal having saturation time information for removing the icing phenomenon at the plurality of injectors to serial signals; (d-3) if the condition for generating the icing phenomenon is not satisfied as the result of step (d-1), providing a peak signal provided during the peak time and a pulse width modulation hold signal during the hold time to the plurality of injectors according to an in-advance programmed injector control order.

Step (d) may further comprise the steps of: (d-4) sensing output electricity of the plurality of injectors to output injector electricity information; and (d-5) receiving the injector electricity information from the LPG engine control unit to monitor the injector electricity information during the peak time and controls the electricity supplied to the plurality of injectors according to the monitoring result.

Step (d-5) may output the injector electricity information of a low potential level if the output voltage of the electricity detector is equal to or greater than the reference voltage, and it outputs the injector electricity information of a high potential level if the output voltage of the electricity detector is less than the reference voltage.

Step (d-5) may output the injector electricity information of a high potential level if the output voltage of the electricity detector is equal to or less than the reference voltage, and it outputs the injector electricity information of a low potential level if the output voltage of the electricity detector is greater than the reference voltage.

Step (e) may receive engine state information of the gasoline engine control unit and varies the time for controlling a cut-off valve of the injector to be opened, the cut-off valve of the injector controlling a fuel injection and fuel cut-off of a connection path between a lower portion of a plunger and a nozzle.

The engine state information may be one or more of fuel temperature information, fuel injection state information, engine rotation information, battery voltage information, and CAN communication state information.

Step (e) may further comprise the steps of: (e-1) receiving crank shaft location information and cam shaft location information from the outside, determining whether the received crank location information and cam shaft location information are normal, and if the crank location information and cam shaft location information are normal as the determination result, determining whether the engine is now being driven; and (e-2) if the engine is being driven, determining, based on the crank shaft location information and cam shaft location information, whether an effective tooth of the crank signal is detected, and if the effective tooth of the crank signals is detected as the determination result, receiving the engine state information from the outside to control the cut-off valve of the injector to be opened.

Step (e-2) may comprise the steps of: (e-2A) controlling the cut-off valve of the injector to be opened after a first predetermined time passes if the fuel temperature information supplied from the outside is greater than or equal to a predetermined value; (e-2A) controlling the cut-off valve of the injector to be opened after a second predetermined time passes if the plurality of injectors are determined to be injecting LPG fuel based on the fuel injection state information; (e-2C) controlling the cut-off valve of the injector to be opened after a third predetermined time passes if the engine is determined to rotate based on the engine rotation information; (e-2D) controlling the cut-off valve of the injector to be opened after a fourth predetermined time passes if the battery voltage is determined to be less than or equal to a predetermined set value based on the battery information; and (e-2E) controlling the cut-off valve of the injector to be opened after a fifth predetermined time passes if the CAN communication line is determined to have an error based on the CAN communication state information.

The predetermined value of the fuel temperature information may be 50° C., the first predetermined time may be 500 msec, the second predetermined time may be 0 msec, the third predetermined time may be 50 msec, the predetermined set value of battery voltage may be 8 volt, the fourth predetermined time may be 100 msec, and the fifth predetermined time may be 500 msec.

Advantageous Effects

*The present invention generates a gas fuel injection signal based on a gasoline fuel injection signal and directly injects LPG fuel within a fuel tank to a combustion chamber using the generated gas fuel injection signal to drive an engine. Therefore, an engine can be easily changed, the manufacturing cost of a duel-car of LPG and gasoline can be reduced, and the manufacturing process thereof can be simplified.

BRIEF DESCRIPTION OF THE DRAWINGS

The above aspects and features of the present invention will be more apparent by describing certain embodiments of the present invention with reference to the accompanying drawings, in which.

MODE FOR THE INVENTION

Exemplary embodiments of the present invention will be described in detail with reference to the annexed drawings.

Figure 1:
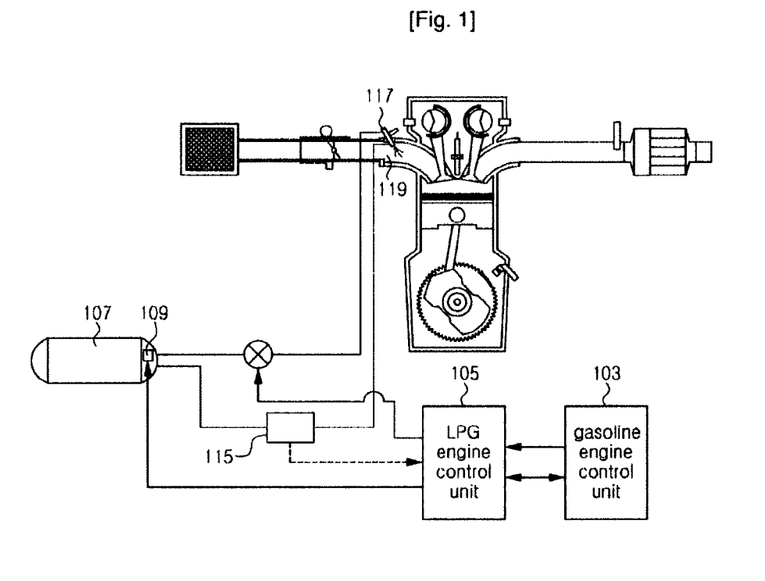
FIG. 1 is a view of a dual-fuel car of gasoline and LPG according to an embodiment of the present invention.
Figure 2:
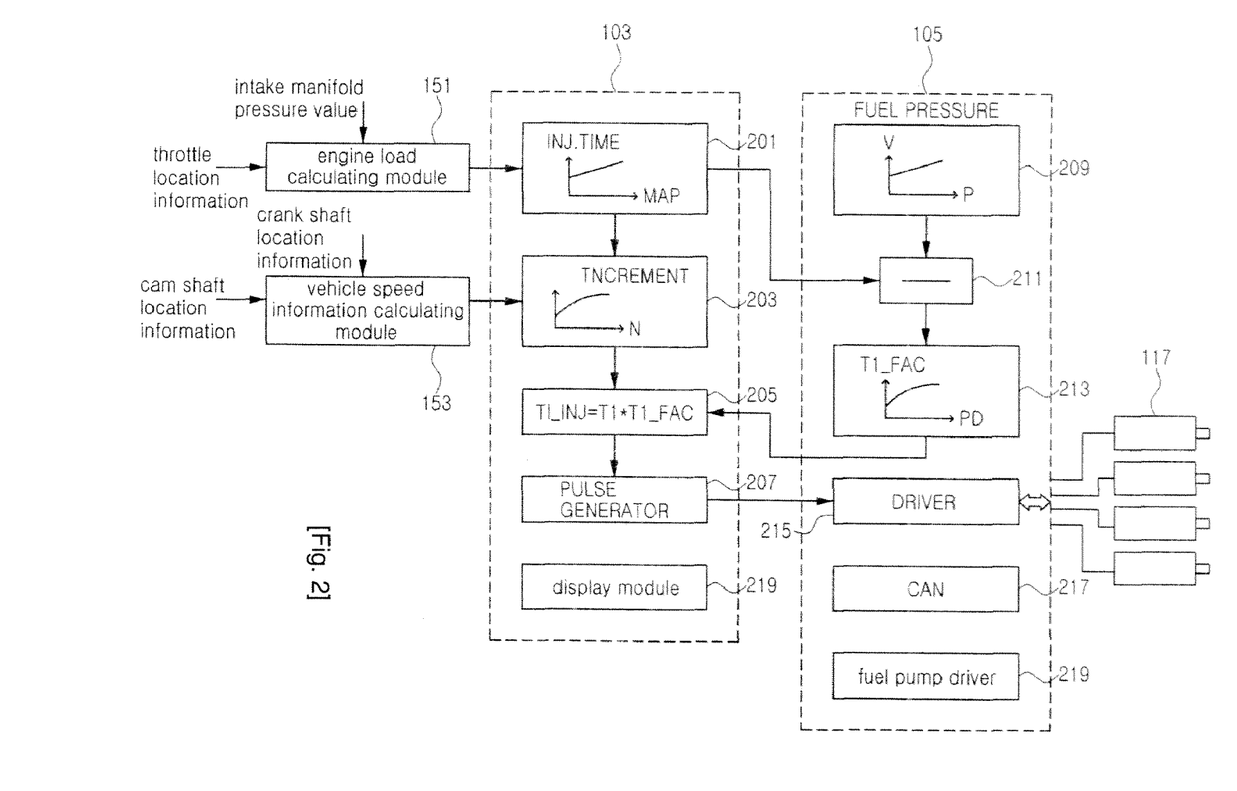
FIG. 2 is a block diagram of a gasoline engine control unit and an LPG engine control unit depicted in FIG. 1.

FIG. 1 is a view of a dual-fuel engine driving apparatus of gasoline and LPG according to an embodiment of the present invention, and FIG. 2 is a block diagram showing an operational process of a gasoline engine control unit and an LPG engine control unit depicted in FIG. 1.

Referring to FIGS. 1 and 2, a dual-fuel engine driving apparatus of gasoline and LPG according to an embodiment of the present invention comprises a fuel pump 109, a pressure controller 115, a fuel tank 107, a gasoline engine control unit 103, and an engine control unit 105. The fuel pump 109 is connected to a supply line of a fuel rail to supply liquefied fuel to an injector part 117 which is attached to an intake manifold 119 and has a plurality of injectors. The pressure controller 115 is connected to a return line 111 of the fuel rail. The fuel tank 107 has the fuel pump 109. The gasoline engine control unit 103 performs a gasoline fuel control. The LPG engine control unit 105 controls the supply of the LPG in liquid form based on the operational signal of the gasoline engine control unit 103.

In the present embodiment, the gasoline engine control unit 103 and the LPG engine control unit 105 are separately provided, but the gasoline engine control unit 103 may be formed integrally with the LPG engine control unit 105.

The gasoline engine control unit 103 calculates the intake air volume from the pressure value of the intake manifold disposed within an air cleaner of a car and the throttle location value to calculate engine load condition information, and calculates the time required for the gasoline engine to inject fuel compared with the calculated engine load condition based on predetermined data information.

The calculated information is provided through a CAN communication module 217 to the LPG engine control unit 105.

Additionally, the gasoline engine control unit 103 detects the engine speed of a car, i.e. the engine speed depending on the injected fuel amount. Here, the engine speed of a car is calculated based on a crank angle sensor, a cam sensor, and vehicle speed information.

The gasoline engine control unit 103 generates pulse signals to drive each injector of the injector part 117 depending on information programmed based on input signals of an air flow sensor, an intake air temperature sensor, an idle position switch, a TDC sensor, and a crank angle sensor.

The LPG engine control unit 105 detects power in proportion to the fuel pressure within the fuel tank 107 from a fuel pressure sensor of a car to generate signals in inverse proportion to the information on the fuel supply time obtained from the gasoline engine control unit 103.

The inverse-proportional signals are to supply the constant fuel amount into the injector part 117 by reducing the time required to inject the fuel if the pressure within the LPG fuel tank 107 of a car is great, and increasing the time required to inject the fuel if the pressure within the LPG fuel tank 107 is small.

Since the above operation is also applied to gasoline, the operation information used when gasoline is employed may be utilized.

The LPG engine control unit 105 calculates a correction coefficient of the injecting amount of the gasoline fuel compared with the liquefied gas fuel based on the result of the operation information.

In other words, a proportional constant of a gasoline fuel injection amount is calculated so that the gasoline fuel injection amount is the same as the liquefied gas fuel injection amount, and the calculated result is provided to the gasoline engine control unit 103.

The gasoline engine control unit 103 sets duties of pulse signals to control the injector part 117.

The duty signals of the pulse signals of the gasoline engine control unit 103 are provided to the LPG engine control unit 105, and the LPG engine control unit 105 having received the duty signals of the pulse signals controls the fuel supply of the injector part 117 through an output driver (not shown) according to the duty signals of the pulse signals.

The injector part 117 is engaged with the intake manifold 119 to maximally prevent evaporation of liquefied gas, and the pressure controller 115 recovers the LPG fuel existing in a return line 111 of fuel, i.e. residual fuel after providing through the fuel pump 109 to the injector part 117, to the fuel tank 107 so that supply error of thereafter-supplied fuel can be reduced.

*Accordingly, the gasoline engine control unit 103 generates fuel injection signals of the gasoline engine, the LPG engine control unit 105 receives the fuel injection control signals from the gasoline engine control unit 103 to control the amount of LPG fuel in liquid form supplied to the injector part 117 based on the fuel pressure information of the fuel pump 109.

The LPG engine control unit 105 further comprises a communication module 217 capable of performing a Controller Area Network (CAN) communication for intercommunication between the proportional constant information provided from the LPG engine control unit 105 and the pulse signal provided from the gasoline engine control unit 103, and it further comprises a display module 219 which is connected to the gasoline engine control unit 103 to inform a car driver of the communication information between the LPG engine control unit 105 and the gasoline engine control unit 103 provided by the communication module 217. The communication information comprises fault information of the LPG engine control unit 105.

The LPG engine control unit 105 further comprises a fuel pump driver 219 to drive the fuel pump.

The process of the gasoline engine generating the fuel injection signals and the gas fuel injection signals will be described in detail hereinafter.

*The gasoline engine control unit 103 comprises an engine load calculation module 151, a vehicle speed information calculation module 153, an injection time calculation module 201, an engine speed calculation module 203, an injector control module 205, a pulse signal generation module 207, and a communication module 217 for performing CAN communication with the LPG engine control unit 105.

The LPG engine control unit 105 comprises a fuel pressure calculation module 209, an operation module 211, a proportional constant calculation module 213, and an injector driver 215, and it can perform a CAN communication for intercommunication between the proportional constant information provided from the LPG engine control unit 105 and the pulse signal provided from the gasoline engine control unit 103.

The engine load calculation module 151 calculates the engine load condition information based on the intake manifold pressure value and the throttle location information, and the injection time calculation module 201 having received the calculated engine load condition receives, as digitized signals, data information predetermined according to the received engine load condition information and the engine speed increase amount, calculated by the engine speed calculation module 203 from the vehicle speed information calculation module 153, to calculate gasoline injection time based on the data information predetermined according to the engine speed increase amount.

The vehicle speed information of the vehicle speed information calculation module 153 is detected by a vehicle speed sensor. In the present embodiment of this invention, the engine speed information is calculated from the vehicle speed information obtained by the vehicle speed sensor, but it may be calculated based on crank shaft location information and cam shaft location information.

The injection time information is provided to the LPG engine control unit 105, and the LPG engine control unit 105 receives the engine speed information calculated according to the pressure information within the fuel tank to compensate for the injection time information.

The above compensation is performed by the operation module 211. As explained above, the injection time is set depending on the LPG fuel tank pressure, and the injection time is in inverse proportion to the fuel tank pressure.

In other words, the above injection time can be used without changes in a reference value of the fuel pressure in the LPG fuel tank 107, but if the fuel pressure in the LPG fuel tank 107 is over than the reference value, the injection time may be reduced in proportion to the difference between the reference value and the fuel pressure, or the injection time may be increased in inverse proportion to the difference between the reference vale and the fuel pressure.

Namely, the injection time refers to that in a gasoline state. To set the injection time, which can be applied to the injector part 117 through the proportional constant calculation module 213, a proportional constant TI_FAC of the gas injection is calculated.

A graph according to the proportional constant TI_FAC is based on Berrnoulli s Equation and calculated as proportional constant TI_FAC=root (reference pressure/current LPG pressure).

The reference pressure is set to 10 bar, and the proportional constant is set according to the current pressure of the LPG fuel tank 107 based on the reference pressure.

The above proportional constant is based on the data information predetermined according to the current pressure of LPG fuel compared with the reference pressure. The proportional constant value may be calculated by an operating device, and the proportional constant value for the current LPG pressure may be used as the predetermined data information.

In the present embodiment, the proportional constant TI_FAC of LPG fuel, which is a liquefied gas fuel, compared to the injection time is set by the predetermined data information. The proportional constant TI_FAC information of the LPG fuel is provided to the injector control module 205 of the gasoline engine control unit 103, and the injector control module 205 multiplies the injection time at the time of employing gasoline by the proportional constant TI_FAC at the time of employing the liquefied gas fuel to calculate the injection time TI_INJ at the time of employing the liquefied gas.

The gasoline engine control unit 103 outputs pulse signals through the pulse signal generation module 207 to control the injectors based on the injection time TI_INJ information of the liquefied gas. The pulse signal generation module 207 is provided to the injector driver 215 of the LPG engine control unit 105, and the injector driver 215 compensates the currently-input pulse signals for the driving signals of the gas injector to provide the driving signals to the injector part 117.

The CAN communication module 217 is used to interchange information between the LPG engine control unit 105 and the gasoline engine control unit 103. The gasoline engine control unit 103 informs the car driver of the default information of the LPG engine control unit 105 among the information interchanged through the CAN communication module 217 between the LPG engine control unit 105 and the gasoline engine control unit 103 through the display module 219 by lamps.

The driving signals of the gas injector of the LPG engine control unit 105 include one of a peak and hold signal and a saturation signal.

Figure 3:
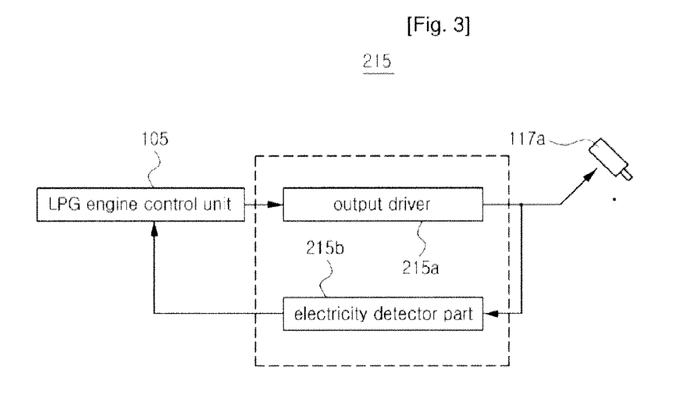
FIG. 3 is a block diagram of an injector driver depicted in FIG. 2.
Figure 4:
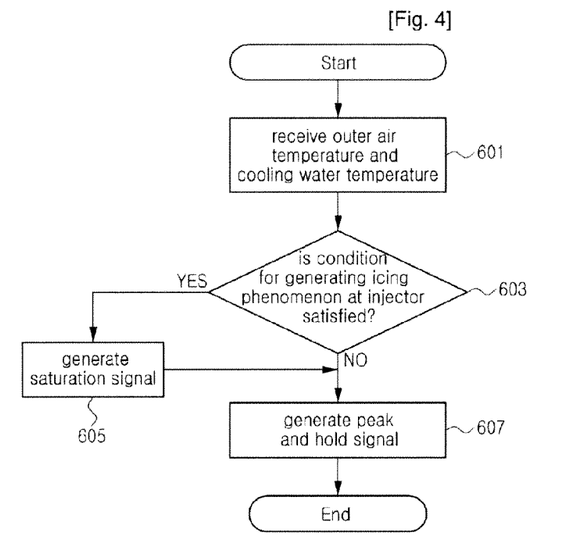
FIG. 4 is a flow chart for explaining a process of outputting a gas fuel injection signal by the LPG engine control unit depicted in FIG. 2.
Figure 5:
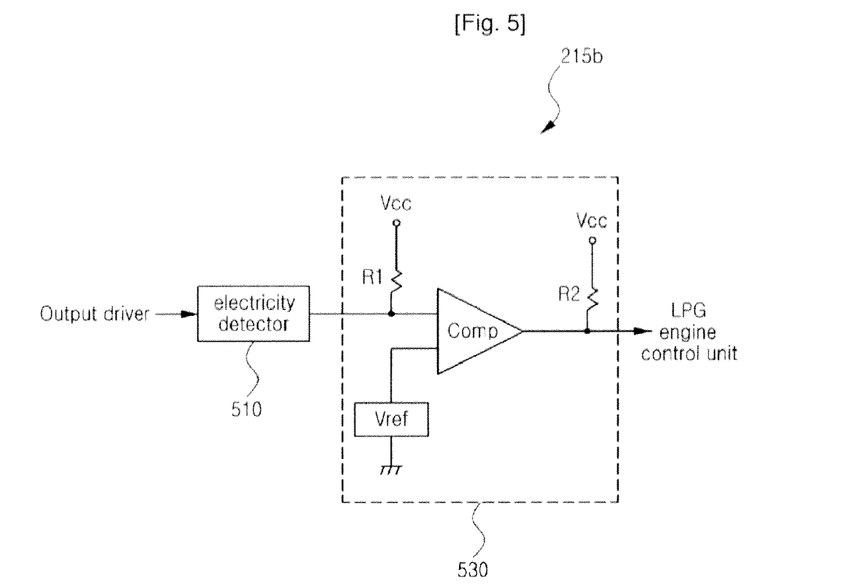
FIG. 5 is a circuit diagram of an electricity detector depicted in FIG. 3.
Figure 6:
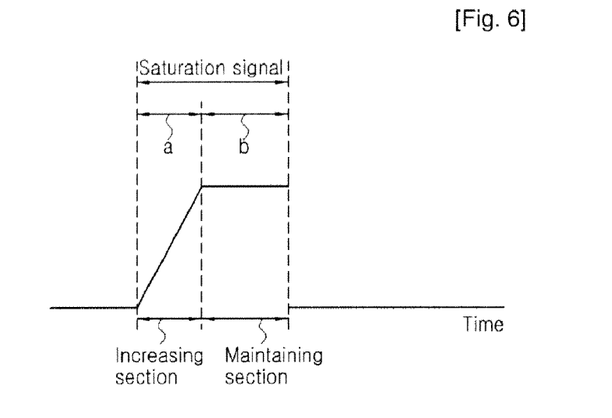
FIG. 6 is a waveform of a saturation signal of the LPG engine control unit depicted in FIG. 4.
Figure 7:
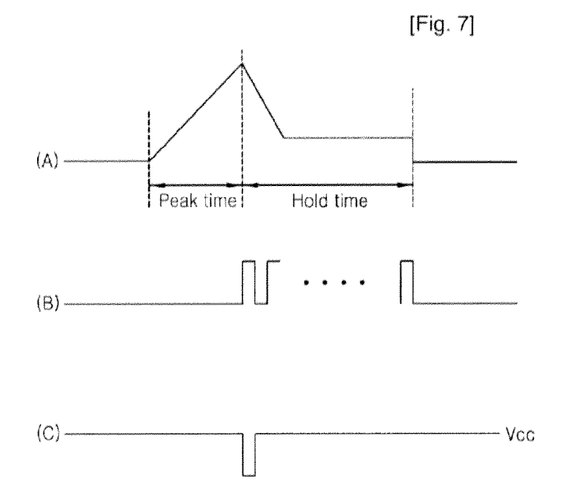
FIG. 7 is a waveform of a peak and hold signal of the LPG engine control unit depicted in FIG. 4.

FIG. 3 is a block diagram of an injector driver 215 depicted in FIG. 2, FIG. 4 is a flow chart for explaining a process of outputting a gas fuel injection signal by the LPG engine control unit depicted in FIG. 2, FIG. 5 is a circuit diagram of an electricity detector depicted in FIG. 3, FIG. 6 is a waveform of a saturation signal of the LPG engine control unit depicted in FIG. 4, and FIG. 7 is a waveform of a peak and hold signal of the LPG engine control unit depicted in FIG. 4.

Referring to FIG. 3, the number of the injector driver 215 is the same as the number of the injector part 117 installed in a car, and the injector driver 215 comprises an output driver part 215a which supplies power to the injectors 117a to supply LPG fuel to the injectors 117a according to the driving signals of the LPG engine control unit 105, wherein the injectors 117a are comprised of the injector part 117.

The injector driver 215 further comprises an electricity detector part 215b which sets the driving signals of the injector 117a depending on the electricity information supplied to the injector 117a and detects the electricity supplied to the injector 117a to sequentially supply the set driving signals of the injector to the output driver part 215a.

Referring to FIG. 5, the electricity detector part 215b comprises an electricity detector 510 which senses electricity of the output driver part 300 to output the electricity in the form of voltage, and a comparison part 530 which compares the output voltage of the electricity detector 510 with a predetermined reference voltage Vref to output injector electricity information according to the comparison result.

The comparison part 530 comprises a comparator Comp which outputs the injector electricity information of a low potential level if the output voltage of the electricity detector 510 is equal to or greater than the reference voltage Vref, and which outputs the injector electricity information of a high potential level if the output voltage of the electricity detector 510 is less than the reference voltage Vref.

Here, the comparator Comp. generally further comprises resonances R1 and R2 to full up negative input voltage and output voltage.

In other words, the LPG engine control unit 105, as shown in FIG. 6, stores saturation time information in which electricity flowing through the injector 117*a* increases during section (a) and the electricity is maintained during section (b) and determines whether the icing phenomenon occurs at an end of the injector part 117 based on outer air temperature and cooling water temperature received through the CAN communication of the gasoline engine control unit 103 to output saturation signals provided to the saturation time information if the icing phenomenon occurs.

Then, the LPG engine control unit 105 stores peak time information which is an initial driving time of the injector part 117 and hold time information which is a drive maintaining time of the injector part 117. The LPG engine control unit 105 stores pulse width modulation frequency information of the hold time and memorizes the peak time and hold time information, and it has a modulation program for the pulse width modulation and a control program to control the driving of peak time and hold time of each injector.

Through the above control program, the LPG engine control unit 105 provides peak signals and hold signals for the sequential operation of the engine cylinder.

In other words, the LPG engine control unit 105, as shown in FIG. 7(A), sequentially provides the peak signals and the hold signals to sequentially operate the cylinder of the injector part 100. The peak signals are control signals for applying initial electricity to control the cylinder to be opened, and the hold signals are control signals to maintain the operation of the injector after the initial electricity.

Thus, the LPG engine control unit 105 outputs the peak signals providing peak time and the hold signals providing hold time to the output driver part 215*a*.

The peak time has a uniform time interval in proportion to the hold time to sequentially control each injector, and the hold time has the same time interval according to the modules of the injector.

The peak signals and the hold signals are output with time intervals as long as the peak time, and the LPG engine control unit 105 generates pulse width modulation (PWM) signals during the hold time as shown in FIG. 7(B).

Thus, the pulse widths of the PWM signals are determined according to characteristics of the injector, i.e. they are designed based on the injector module. Accordingly, the PWM signals supplied during the hold time are provided to the injector so that the fuel can be injected.

In other words, the LPG engine control unit 105 outputs the peak signals during the peak time, and the output driver 117*b* performs a predetermined power amplification to drive the injector 117*a* so that power can be supplied to the injector by the pulse width of the PWM signals. The peak and hold signals are supplied to the output driver part 215*a*.

The peak time of the peak and hold signals has uniform time intervals in proportion to the hold time to sequentially control each injector, and the hold time has the same time intervals according to the injector modules.

Based on the above characteristics, the operations of the LPG engine control unit 105 will be explained as follows.

The LPG engine control unit 105 determines whether the icing phenomenon occurs at the injector part 117 based on the outer air temperature and cooling water temperature, and if the icing phenomenon occurs, it provides saturation signals to the output driver part 215*a*, and if the icing phenomenon does not occur, it provides peak and hold signals.

The saturation signals are control signals to remove the icing phenomenon generated at the end of the injector 117*a* by applying initial electricity to the injector 117*a*, and they have an increasing section (a) in which electricity flowing through the injector part 117 increases so as to be provided as much as a predetermined level and a maintaining section (b), as shown in FIG. 6.

The saturation time is to generate heat at each end of the injectors of the injector part 107 with predetermined electricity to remove the icing phenomenon generated at the end of the injector part 107, and the increasing time and the maintaining time vary depending on the characteristics of coils within the injector 117*a*, battery voltages, and required amount of fuel.

For example, if an injector has an increasing section of 1.75 msec, a maintaining section of 8.25 msec and resistance of 2 ohm, heat of 86 mJ in the increasing section and heat of 808 mJ in the maintaining section are generated during one saturation time, and if injection signals are provided 25 times during one second, a total of 22350 mJ heat is generated. The icing phenomenon is removed by the above heat. Here, the 25 times are given on the assumption that a common engine speed is 300 rpm.

The injector electricity information, as illustrated in FIG. 7(C), is detected by the electricity detector part 215*b* and provided to the LPG engine control unit 105, wherein the injector electricity information shows electricity which is supplied from the output driver part 215*a* to the injector 117*a* at the end of the peak time. The LPG engine control unit 105 determines the electricity amount of the peak time based on the received injector electricity information of the electricity detector part 117*c*.

In other words, the output electricity of the output driver part 215*a* is detected by the electricity detector 510 to be output in the form of voltage, and the output voltage of the electricity detector 510 is supplied to the negative (−) terminal of the comparator Comp.

The comparator Comp, as illustrated in FIG. 7(C), outputs the injector electricity information of a low potential level if the output voltage of the electricity detector 510 is equal to or greater than the reference voltage Vref of a positive (+) terminal of the comparator Comp, and it outputs the injector electricity information of a high potential level if the output voltage of the electricity detector 510 is less than the reference voltage Vref.

The injector electricity information is supplied to the LPG engine control unit 105, and the LPG engine control unit 105 controls the electricity amount supplied to the injector part 107 according to levels of the injector electricity information to output peak signals and hold signals having peak time and hold time according to the controlled electricity amount. The peak signals and hold signals are amplified by the output driver part 215*a* and provided to the injector 117*a*, the injector 117*a* injects fuel by the peak signals and hold signals providing the peak time and hold time.

FIG. 4 is a flow chart for explaining the control process of the LPG engine control unit 105 depicted in FIG. 3. First, the LPG engine control unit 105 receives the outer air temperature and cooling water temperature provided from the outside (step 601), it determines whether the condition for generating icing phenomenon at the injector 117a is satisfied (step 603), and if the icing phenomenon occurs, it provides in advance programmed saturation signals (step 605).

If the condition for generating the icing phenomenon at the injector 117a is not satisfied in the step of 603, the LPG engine control unit 105 generates peak and hold signals having peak time, which is an initial driving time of the injector, and hold time, which is a maintaining time of the driving. (step 607).

In other words, if the condition for generating the icing phenomenon at the injector 117a is satisfied, the icing phenomenon of the injector is removed by the saturation signals providing the saturation time, and then fuel can be injected by the peak and hold signals. If the condition for generating the icing phenomenon at the injector 117a is not satisfied, fuel is injected by the peak and hold signals providing the peak and hold time.

Figure 8:
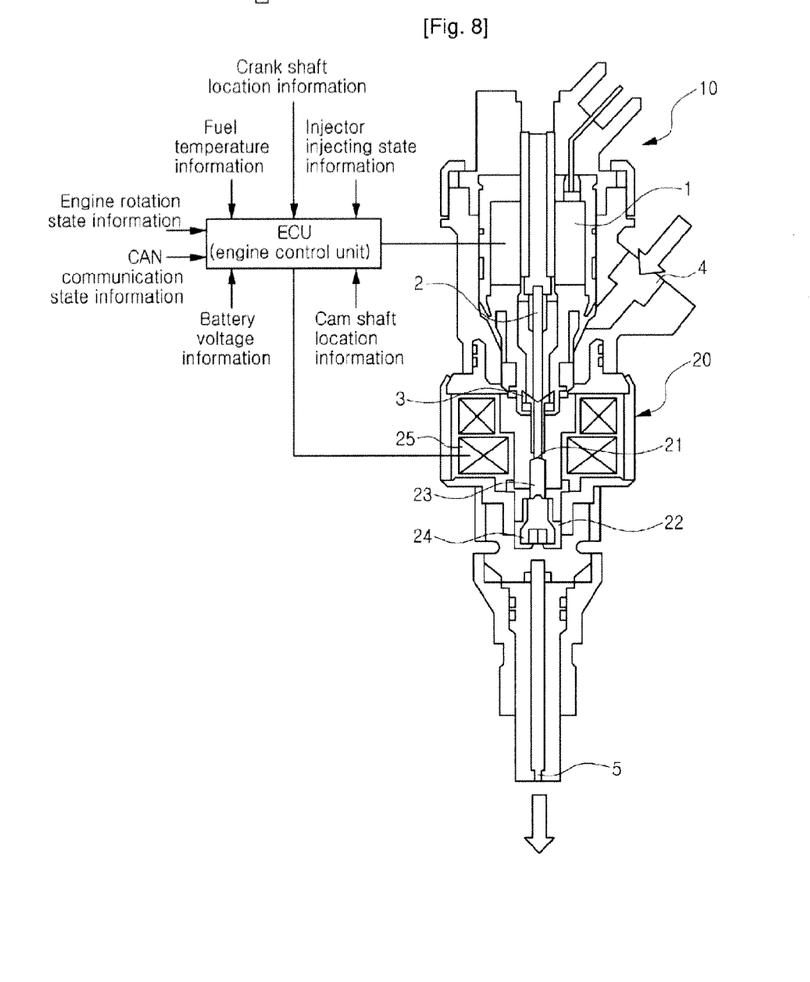
FIG. 8 illustrates an example of an injector depicted in FIG. 3.

FIG. 8 illustrates in detail the injectors 117a depicted in FIG. 3.

Referring to FIG. 8, the injectors 117a are inserted and installed in corresponding positions of the intake manifold 119, and they are connected in line in one fuel rail.

Each injector 117a has a solenoid coil 1 and a plunger 2. If power is applied to the solenoid coil 1 by the LPG engine control unit 105, the plunger 2 is raised by the generated magnetic force to be apart from a plunger sheet 3 so that fuel flowing into an inlet 4 can be injected through a nozzle 5.

When a car driving is terminated and the engine is stopped, liquefied fuel, having flowed into the inlet 4, remains in the injector 117a, and the remaining fuel directly flows into the cylinder because the plunger 2 and the plunger sheet 3 cannot perfectly block the fuel.

To prevent the fuel from being leaked, a cut-off valve of the injector 20 is formed in a fuel path between the plunger 2 and the nozzle 5 to block fuel, wherein the plunger 2 opens and closes the fuel path between the inlet, which is raised and lowered by the solenoid coil and in which fuel flows, and the nozzle, through which fuel is injected, when a start key is off.

The cut-off valve of the injector 20 is formed in the middle of the injector 117a in the axial direction. This means that the fuel path within the cut-off valve of the injector 20 is formed in an axial direction of the injector 117a to connect a lower point of the plunger 2 and an upper point of the nozzle 5, and a plunger 24 of the cut-off valve of injector is raised and lowered in an axial direction of the injector 10, i.e. a vertical direction in FIG. 8, in the connection path to open and close the fuel path.

In other words, the cut-off valve of the injector 20 comprises a fuel path 21 which connects an upper point of the nozzle 5 and a lower point of the upper plunger 2 and plunger sheet 3 within a valve housing formed between an upper housing and a nozzle housing of the injector 117a, a fuel chamber 22, in which predetermined fuel can be gathered, formed at a lower portion of the fuel path 21, a plunger 24 which is formed in the fuel chamber 22 to be elastically and downwardly supported by a spring 23, and a solenoid coil 25 which is formed in an inner circumferential surface of the valve housing and takes a configuration of enclosing the fuel path 21.

The cut-off valve of the injector 20 having the above structure raises the plunger 24 by the magnetic force, which is generated by the LPG engine control unit 105 applying power to the solenoid coil 25, to open the fuel path to the nozzle 5, which has been blocked by the plunger 24. Additionally, as the starting key is on/off, the cut-off valve of the injector 20 is on/off after a predetermined time passes.

Figure 9:
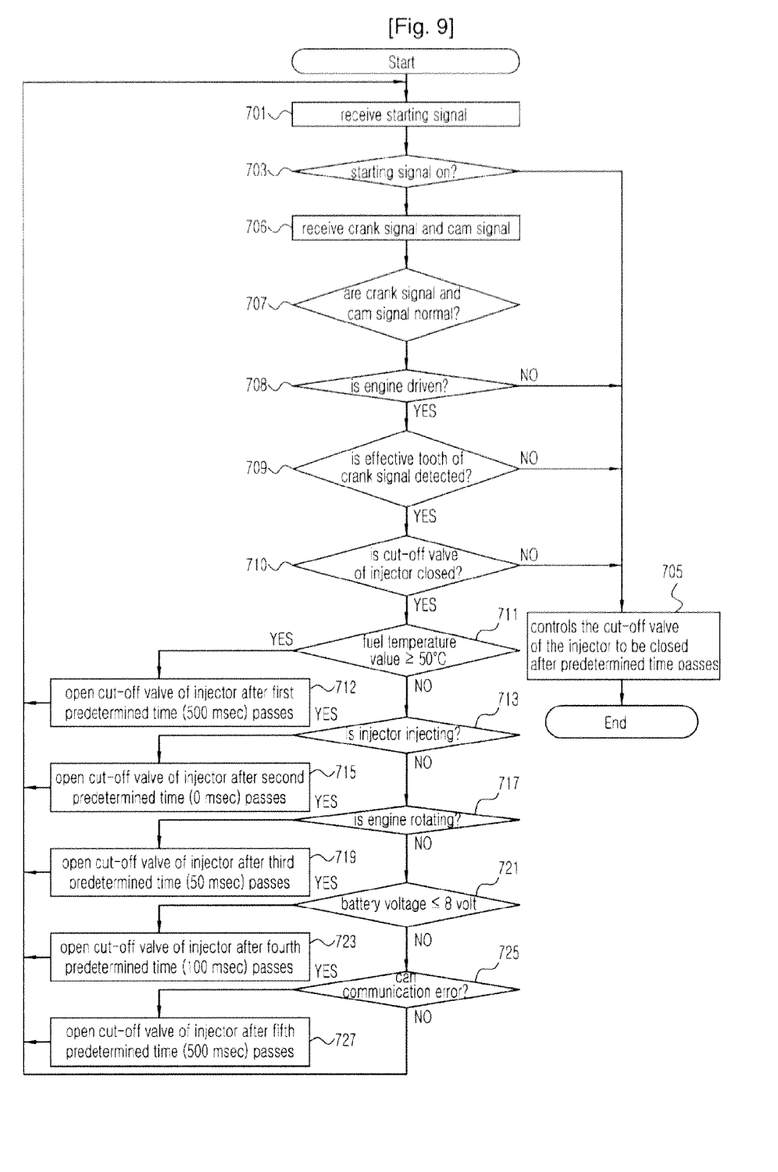
FIG. 9 is a flow chart of an example of a process of controlling a cut-off valve of the injector by the LPG engine control unit depicted in FIG. 1.

FIG. 9 is a flowchart of the control process of the cut-off valve of the injector 20 according to the engine conditions by the LPG engine control unit 105 depicted in FIG. 8. The LPG engine control unit 105 receives starting signals from the starting key (step 701), and it determines whether the starting signals mean that the starting is on (step 703).

As a result of step 703, if the starting signals mean that the starting is on, the LPG engine control unit 105 receives crank signals and cam signals from the outside (step 706), it determines whether the received crank signals and cam signals are normal (step 707), and if the crank signals and cam signals are normal as the determination result, it determines whether the engine is now being driven (step 708).

If the engine is now being driven as the determination result in step 708, the LPG engine control unit 105 determines, based on the crank signals and cam signals received in step 706, whether an effective tooth of the crank signals is detected (step 709), and if the effective tooth of the crank signals is detected as the determination result, the LPG engine control unit 105 determines whether the cut-off valve of the injector is closed (step 710), and if the cut-off valve of the injector 20 is closed as the determination result, the LPG engine control unit 105 sets the time for controlling the cut-off valve of the injector 20 to be opened according to the engine state information.

In other words, the LPG engine control unit 105 determines, by measuring temperature of fuel supplied from the outside, whether a fuel temperature value is greater than or equal to a predetermined set value (50 C) (step 711), and if the fuel temperature value is greater than or equal to the predetermined set value, it sets the cut-off valve of the injector 20 to a general mode and sequentially controls the cut-off valve of the injector 20 to be opened according to an order of cylinder valves set in advance after a first predetermined time (500 msec) corresponding to the general mode passes (step 712).

If the fuel temperature value is less than the predetermined set value as the result of step 711, the LPG engine control unit 105 determines whether the injector is now injecting (step 713), and if the injector is injecting, it sets the cut-off valve of the injector 20 to an urgency open mode and sequentially controls the cut-off valve of the injector 20 to be opened according to an order of cylinder valves set in advance after a second predetermined time (0 msec) corresponding to the urgency open mode passes (step 715). In other words, if the cut-off valve of the injector 20 is set to the urgency open mode, the cut-off valve of the injector 20 is directly controlled to be opened without time delay.

If the injector is not injecting as the result of step 713, the LPG engine control unit determines whether the engine is now rotating (step 717), and if the engine is rotating, it sets the cut-off valve of the injector 20 to an engine rotation mode and sequentially controls the cut-off valve of the injector 20 to be opened according to an order of cylinder valves set in advance after a third predetermined time (50 msec) corresponding to the engine rotation mode passes (step 719).

If the engine is not rotating as the result of step 717, the LPG engine control unit determines whether the battery is in a low voltage (8 volt) (step 721), and if so, the LPG engine control unit sets the cut-off valve of the injector 20 to a low voltage mode and sequentially controls the cut-off valve of the injector 20 to be opened according to an order of cylinder valves set in advance after a fourth predetermined time (100 msec) corresponding to the low voltage mode passes (step 723).

If the battery is not in a low voltage as the result of step 721, the LPG engine control unit 105 determines, by the CAN communication information, whether the engine state is not correctly determined due to the CAN communication line (S725), and it sets the cut-off valve of the injector 20 to an emergency drive mode depending on the determination result and sequentially controls the cut-off valve of the injector 20 to be opened according to an order of cylinder valves set in advance after a fifth predetermined time (500 msec) corresponding to the emergency drive mode passes (step 727).

Accordingly, the cut-off valve of the injector 20 is controlled to be opened while power is applied to the solenoid coil 25. The plunger 24 is raised by the power applied to the solenoid coil 25 so that the fuel path is always opened. At this time, the above operation does not affect the control of fuel injection amount by opening and closing the upper plunger 2.

The aforementioned first to fifth predetermined times are obtained by experiments of predetermined times and in advance set lookup table values.

Meanwhile, if the starting is not on in step 703, or if the engine is not now being driven in step 708, the LPG engine control unit 105 applies power to the solenoid coil 25 and controls the cut-off valve of the injector 20 to be closed after predetermined time passes (step 705). In other words, if the starting key is off, the plunger 24 cuts off the fuel path by cutting off the power from the LPG engine control unit 105 to the solenoid coil 25 after predetermined time passes.

At this time, since the upper plunger 2 is automatically lowered to cut off the fuel path, the fuel path within the injector 10 is cut off twice by two plungers. Thus, it can be more perfectly prevented for liquefied fuel to leak and flow into the cylinder during the engine s standstill.

While the invention has been shown and described with reference to certain embodiments thereof, it will be understood by those skilled in the art that various changes in form and details may be made therein without departing from the spirit and scope of the invention as defined by the appended claims.

INDUSTRIAL APPLICABILITY

The present invention generates gas fuel injection signals based on gasoline fuel injection signals and directly injects LPG fuel within a fuel tank to a combustion chamber using the generated gas fuel injection signals to drive an engine. Therefore, the engine can be easily changed, the manufacturing cost of a dual-fuel car of LPG and gasoline can be decreased, and the manufacturing process thereof can be simplified.

The invention claimed is:

1. An apparatus for supplying gasoline and liquefied petroleum gas fuel of a liquefied petroleum gas (LPG) car having a liquefied petroleum gas injection (LPI) system, which is a direct LPG injection scheme, the apparatus comprising:

a plurality of injectors which are formed at an intake manifold and inject one of gasoline fuel and LPG fuel to a cylinder to drive an engine;

a gasoline engine control unit which receives an engine load condition, generates a gasoline fuel injection signal according to injection time of the gasoline fuel compared to the received engine load condition, calculates time information for controlling the plurality of injectors based on engine speed information and proportional constant information and generates a pulse signal for controlling the plurality of injectors based on the time information;

a LPG engine control unit connected to the gasoline engine control unit, wherein the LPG engine control unit receives data information predetermined according to the gasoline fuel injection time, compensates for the predetermined data information to be in inverse-proportion to a fuel pressure exhausted from a LPG fuel tank according to a driving of a fuel pump formed within the LPG fuel tank, calculates the proportional constant information corresponding to the fuel injection time when the LPG fuel is supplied based on the compensated data information, provides the calculated proportional constant information to the gasoline engine control unit, and receives the pulse signal provided from the gasoline engine control unit to convert the signal to a gas fuel injection signal for driving the plurality of injectors and provide it to the plurality of injectors; and a LPG engine which (1) supplies the LPG fuel to the intake manifold to admix the LPG fuel with air supplied from the outside, the LPG fuel within the LPG fuel tank being exhausted by the fuel pump driven by the control of the LPG engine control unit (2), injects the mixed LPG fuel through the injectors to the cylinder to drive the engine, and (3) returns the fuel remaining in the plurality of injectors to the LPG fuel tank.

2. The apparatus according to claim 1, wherein the gasoline engine control unit and the LPG engine control unit are integrally formed with each other.

3. The apparatus according to claim 1, wherein the engine load condition of the gasoline engine control unit is calculated by one of intake air amount information, throttle location information, and intake manifold pressure information.

4. The apparatus according to claim 1, wherein the engine speed information is one of vehicle speed information, crank shaft location information, and cam shaft location information.

5. The apparatus according to claim 1, wherein the LPG engine control unit further comprises a communication module capable of controller area network (CAN) communication to transmit the proportional constant information provided from the LPG engine control unit to the gasoline engine control unit and receive the pulse signal provided from the gasoline engine control unit.

6. The apparatus according to claim 5, wherein the LPG engine control unit further comprises a display module which is connected to the gasoline engine control unit to inform a car driver of the communication information between the LPG engine control unit and the gasoline engine control unit provided by the CAN communication module.

7. The apparatus according to claim 6, wherein the communication information is default information detected by the LPG engine control unit.

8. The apparatus according to claim 1 wherein the LPG engine control unit further comprises a fuel pump driver for driving the fuel pump.

9. The apparatus according to claim 1, wherein the pressure of the LPG gas in liquid form is greater than the fuel pressure in the fuel tank by 5 Bar.

10. The apparatus according to claim 1, wherein the LPG engine control unit (1) stores peak time, hold time information, and saturation time information, the peak time and hold time information being the driving time of the injector, the saturation time information relevant to removing an icing phenomenon, based on outer air temperature and cooling water temperature supplied from the gasoline engine control unit, (2) outputs a saturation signal providing the saturation time according to an in-advance programmed injector control order if a condition for generating the icing phenomenon is satisfied, and (3) outputs a peak and hold signal providing the peak time and hold time if the condition for generating the icing phenomenon is not satisfied.

11. The apparatus according to claim 10, wherein the saturation signal has an increasing section in which electricity increases to provide predetermined voltages to the injector and a maintaining section.

12. The apparatus according to claim 10, wherein the peak and hold signal comprises a peak signal providing peak time, which is an initial driving time of the injector, and a pulse width modulation hold signal corresponding to maintenance of the driving of the injector during hold time, which is a drive maintaining time of the injector.

13. The apparatus according to claim 1, wherein each of the plurality of injectors each comprises:
an output driver which is connected to an output end of the LPG engine control unit when the engine is initially driven to supply one of a peak and hold signal and a saturation signal to the corresponding injector; and
an electricity detector part which senses output electricity of a corresponding injector and outputs injector electricity information to supply the electricity to the LPG engine control unit.

14. The apparatus according to claim 13, wherein the electricity detector part monitors the injector electricity information during the peak time and controls the electricity supplied to the corresponding injector depending on the monitoring result.

15. The apparatus according to claim 14, wherein the electricity detector part comprises:
an electricity detector which senses electricity of the output driver to output electricity in the form of voltage; and
a comparator which compares the output voltage of the electricity detector with a predetermined reference voltage and outputs injector electricity information depending on the comparison result.

16. The apparatus according to claim 15, wherein the comparator outputs injector electricity information of a low potential level if the output voltage of the electricity detector is equal to or greater than the reference voltage; and outputs injector electricity information of a high potential level if the output voltage of the electricity detector is less than the reference voltage.

17. The apparatus according to claim 15, wherein the comparator outputs injector electricity information of a high potential level if the output voltage of the electricity detector is equal to or less than the reference voltage and outputs injector electricity information of a low potential level if the output voltage of the electricity detector is greater than the reference voltage.

18. The apparatus according to claim 13, wherein the corresponding injector further comprises a cut-off valve of the injector which is formed in a fuel path between a plunger and a nozzle, and cuts off the fuel path between the plunger and the nozzle when a start key is off, the plunger opening and closing the fuel path between an inlet, which is raised and lowered by a solenoid coil and in which fuel flows, and the nozzle, through which fuel is injected, and wherein if a received starting signal is on, the LPG engine control unit determines, based on crank shaft location information and cam shaft location information supplied from the gasoline engine control unit, whether the engine is driven, and if the engine is determined to be driven, it receives engine state information of the gasoline engine control unit to vary time for controlling the cutoff valve of the injector to be opened.

19. The apparatus according to claim 18, wherein the LPG engine control unit receives engine state information of the gasoline engine control unit to vary the time for controlling the cut-off valve of the injector to be opened if a first effective tooth is detected by the crank shaft location information and the cam shaft location information.

20. The apparatus according to claim 19, wherein the engine state information is one or more of fuel temperature information, fuel injection state information, engine rotation information, battery voltage information, and CAN communication state information.

21. The apparatus according to claim 18, wherein the LPG engine control unit controls the cut-off valve of the injector to be opened after a first predetermined time passes if the fuel temperature information supplied is greater than or equal to a predetermined value.

22. The apparatus according to claim 21, wherein the predetermined value is 50° C., and the first predetermined time is 100 msec.

23. The apparatus according to claim 18, wherein the LPG engine control unit controls the cutoff valve of the injector to be opened after a second predetermined time passes if the plurality of injectors are determined to be injecting LPG fuel based on the fuel injection state information.

24. The apparatus according to claim 23, wherein the second predetermined time is 0 msec.

25. The apparatus according to claim 18, wherein the LPG engine control unit controls the cut-off valve of the injector to be opened after a third predetermined time passes if the engine is determined to rotate based on the engine rotation information.

26. The apparatus according to claim 25, wherein the third predetermined time is 50 msec.

27. The apparatus according to claim 18, wherein the LPG engine control unit controls the cut-off valve of the injector to be opened after a fourth predetermined time passes if the battery voltage is determined to be less than or equal to a predetermined set value based on the battery information.

28. The apparatus according to claim 27, wherein the predetermined value is 8 volts, and the fourth predetermined time is 100 msec.

29. The apparatus according to claim 18, wherein the LPG engine control unit controls the cut-off valve of the injector to be opened after a fifth predetermined time passes if the CAN communication line is determined to have an error based on the CAN communication state information.

30. The apparatus according to claim 29, wherein the fifth predetermined time is 500 msec.

31. A method for supplying fuel of a LPG car having an LPI system, the method comprising:
(a) receiving an engine load condition by throttle location information and intake manifold input information, and transmitting data information predetermined according to injection time of a gasoline fuel compared to the received engine load condition to a LPG engine control unit;
(b) the LPG engine control unit receiving the data information predetermined according to the injection time of the gasoline fuel, compensating for the predetermined data information to be in inverse-proportion to a fuel pressure exhausted from a LPG fuel tank according to a driving of a fuel pump formed within the LPG fuel tank, calculating the proportional constant information corresponding to the fuel injection time when the LPG fuel is supplied based on the compensated data information, and providing the calculated proportional constant information to the gasoline engine control unit;
(c) a gasoline engine control unit calculating time information for controlling a plurality of injectors based on engine speed information provided from the outside, the injection time information of gasoline fuel in operation (a), and the proportional constant information in operation (b), and generating a pulse signal for controlling the plurality of injectors based on the time information to transmit the pulse signal to the LPG engine control unit;

(d) the LPG engine control unit receiving the pulse signal provided from the gasoline engine control unit to convert the signal to a gas fuel injection signal for driving the plurality of injectors and providing it to the plurality of injectors; and (e) supplying the LPG fuel to an intake manifold to admix the LPG fuel with air supplied from the outside, the LPG fuel within the LPG fuel tank being exhausted by the fuel pump driven by the control of the LPG engine control unit, injecting the mixed LPG fuel through the plurality of injectors to a cylinder to drive an engine, and returning the fuel remaining in the plurality of injectors to the LPG fuel tank.

32. The method according to claim 31, wherein the engine load condition is calculated by one of intake air amount information, throttle location information, and intake manifold pressure information.

33. The method according to claim 31, wherein the engine speed is one of vehicle speed information, crank shaft location information, and cam shaft location information.

34. The method according to claim 31, wherein a CAN communication is performed to transmit the proportional constant information provided from the LPG engine control unit to the gasoline engine control unit and receive the pulse signal provided from the gasoline engine control unit.

35. The method according to claim 34, further comprising:
(f) displaying communication information between the LPG engine control unit and the gasoline engine control unit provided by the CAN communication module.

36. The method according to claim 35, wherein the communication information is default information detected by the LPG engine control unit.

37. The method according to claim 31, wherein operation (d) determines, based on outer air temperature and cooling water temperature provided, whether a condition for generating the icing phenomenon at ends of the plurality of injectors is satisfied, and if the condition for generating the icing phenomenon is satisfied, outputting a saturation signal having saturation time information for removing the icing phenomenon at the plurality of injectors to serial signals, and if the condition for generating the icing phenomenon is not satisfied, outputting a peak and hold signal having peak time and hold time information, which is the driving time of the plurality of injectors, to serial signals, respectively.

38. The method according to claim 31, wherein operation (d) comprises:
(d-1) determining, based on outer air temperature and cooling water temperature provided from the outside, whether a condition for generating the icing phenomenon at ends of the plurality of injectors is satisfied;
(d-2) if the condition for generating the icing phenomenon is satisfied as the result of operation (d-1), outputting a saturation signal having saturation time information for removing the icing phenomenon at the plurality of injectors to serial signals,
(d-3) if the condition for generating the icing phenomenon is not satisfied as the result of operation (d-1), providing a peak signal provided during the peak time and a pulse width modulation hold signal during the hold time to the plurality of injectors according to an in-advance programmed injector control order.

39. The method according to claim 38, wherein operation (d) further comprises:

(d-4) sensing output electricity of the plurality of injectors to output injector electricity information; and
(d-5) receiving the injector electricity information from the LPG engine control unit to monitor the injector electricity information during the peak time and controlling the electricity supplied to the plurality of injectors according to the monitoring result.

40. The method according to claim 39, wherein operation (d-5) outputs the injector electricity information of a low potential level if the output voltage of the electricity detector is equal to or greater than the reference voltage, and outputs injector electricity information of a high potential level if the output voltage of the electricity detector is less than the reference voltage.

41. The method according to claim 39, wherein operation (d-5) outputs the injector electricity information of a high potential level if the output voltage of the electricity detector is equal to or less than the reference voltage, and outputs injector electricity information of a low potential level if the output voltage of the electricity detector is greater than the reference voltage.

42. The method according to claim 31, wherein operation (e) receives engine state information of the gasoline engine control unit and varies the time for controlling a cut-off valve of the injector to be opened, the cut-off valve of the injector controlling a fuel injection and fuel cut-off of a connection path between a lower portion of a plunger and a nozzle.

43. The method according to claim 42, the engine state information is one or more of fuel temperature information, fuel injection state information, engine rotation information, battery voltage information, and CAN communication state information.

44. The method according to claim 31, wherein operation (e) further comprises:
(e-1) receiving crank shaft location information and cam shaft location information, determining whether the received crank location information and cam shaft location information are normal, and if the crank location information and cam shaft location information are normal as the determination result, determining whether the engine is now being driven; and
(e-2) if the engine is being driven, determining, based on the crank shaft location information and cam shaft location information, whether an effective tooth of the crank signal is detected, and if the effective tooth of the crank signals is detected as the determination result, receiving the engine state information from the outside to control the cut-off valve of the injector to be opened.

45. The method according to claim 44, wherein operation (e-2) comprises:
(e-2A) controlling the cut-off valve of the injector to be opened after a first predetermined time passes if the fuel temperature information supplied from the outside is greater than or equal to a predetermined value;
(e-2A) controlling the cut-off valve of the injector to be opened after a second predetermined time passes if the plurality of injectors are determined to be injecting LPG fuel based on the fuel injection state information;
(e-2C) controlling the cut-off valve of the injector to be opened after a third predetermined time passes if the engine is determined to rotate based on the engine rotation information;
(e-2D) controlling the cut-off valve of the injector to be opened after a fourth predetermined time passes if the battery voltage is determined to be less than or equal to a predetermined set value based on the battery information; and (e-2E) controlling the cut-off valve of the injector to be opened after a fifth predetermined time passes if the CAN communication line is determined to have an error based on the CAN communication state information.

46. The method according to claim 45, wherein the predetermined value of the fuel temperature information is 50° C., the first predetermined time is 500 msec, the second predetermined time is 0 msec, the third predetermined time is 50 msec, the predetermined set value of battery voltage is 8 volts, the fourth predetermined time is 100 msec, and the fifth predetermined time is 500 msec.

* * * * *